(12) United States Patent
Atsuta

(10) Patent No.: US 6,577,715 B1
(45) Date of Patent: Jun. 10, 2003

(54) MODEM APPARATUS, COMMUNICATION CONTROL APPARATUS, COMMUNICATION TERMINAL APPARATUS, AND COMMUNICATION CONTROL METHOD

(75) Inventor: Akira Atsuta, Tokyo (JP)

(73) Assignee: Matsushita Graphic Communication Systems, Inc., Tokyo (JP)

( * ) Notice: Subject to any disclaimer, the term of this patent is extended or adjusted under 35 U.S.C. 154(b) by 0 days.

(21) Appl. No.: 09/523,599

(22) Filed: Mar. 10, 2000

(30) Foreign Application Priority Data

Jun. 2, 1999 (JP) .......................... 11-154447

(51) Int. Cl.[7] .......................... H04M 11/00
(52) U.S. Cl. .............. 379/100.17; 379/93.28; 375/222
(58) Field of Search ............. 379/100.17, 100.15, 379/100.16, 100.01, 93.28, 90.01; 375/222; 358/434, 435

(56) References Cited

U.S. PATENT DOCUMENTS 6,292,509 B1 * 9/2001 Fujino .................. 379/100.17

FOREIGN PATENT DOCUMENTS

| FR | 2 678 639 | 3/1991 |
| JP | 62269564 | 11/1987 |
| JP | 9-116718 | 5/1997 |
| JP | 11-88632 | 3/1999 |
| WO | WO 96/17087 | 6/1996 |

OTHER PUBLICATIONS

English Language Abstract of JP 11–88632.
English Language Abstract of JP 9–116718.
Fahy, et al. E., "Self–Sustained Sequence Replication (3SR): An Isothermal Transcription–basedAmplification System Alternative to PCR"; PCR Methods and Appliations, vol. 1, No. 1, Jan. 1, 1991, pp. 25–33.
European Journal of Biochemistry243, 1997, pp. 358–364.

* cited by examiner

Primary Examiner—Melur Ramakrishnaiah
(74) Attorney, Agent, or Firm—Greenblum & Bernstein, P.L.C.

(57) ABSTRACT

In the present invention, when a procedure signal specified in a predetermined Recommendation is received from an answering side, a variable signal detection section detects signal components each at one of a plurality of frequencies from the procedure signal. Based on the detected result in the variable signal detection section, a comparison section outputs an identification signal indicative of a type of Recommendation. Based on the identification signal, a control section of a host controls the switching of operation modes of a modem.

10 Claims, 9 Drawing Sheets

MODEM APPARATUS, COMMUNICATION CONTROL APPARATUS, COMMUNICATION TERMINAL APPARATUS, AND COMMUNICATION CONTROL METHOD

BACKGROUND OF THE INVENTION

1. Field of the Invention

The present invention relates to a modem apparatus, communication control apparatus and communication terminal apparatus with the function of performing communications based on communication procedures conforming to ITU-T Recommendations, and the communication control method therefor.

2. Description of the Related Art

Conventionally, a communication terminal apparatus provided with a modem for performing communications based on communication procedures conforming to ITU-T Recommendation V.34 (hereinafter, referred to as Recommendation V.34) initiates a communication according to a sequence specified in ITU-T Recommendation V.8 (hereinafter, referred to as Recommendation V.8). Specifically, in response to a call placed from a calling terminal, an answering terminal transmits an ANSam signal to the calling terminal. When the calling terminal detects the ANSam signal, the calling terminal transmits a CM signal to the answering terminal. When the answering terminal detects the CM signal, the answering terminal transmits a JM signal to the calling terminal. Thereafter, the communication procedure shifts from that conforming to Recommendation V.8 to that conforming to Recommendation V.34.

In the case where transmission and reception of procedure signals are performed according to the sequence specified in Recommendation V.8, when the calling terminal incorrectly recognizes the procedure signal transmitted from the answering terminal, the calling terminal and answering terminal each continues transmitting the procedure signal based on the different communication procedure until receiving an expected signal. The case sometimes occurs thereby where communication operations are looped in the calling terminal and answering terminal.

Japanese Unexamined Patent Publication HEI-9-116718discloses a communication terminal apparatus provided with a modem for performing communications based on the communication procedure conforming to Recommendation V.8. Despite the expected procedure signal being the JM signal, the communication terminal apparatus detects a DIS signal based on the communication procedure conforming to Recommendation T.30 that is transmitted incorrectly from the answering terminal, after transmitting the CM signal. Specifically, the communication terminal apparatus judges a flag pattern of the DIS signal to detect the DIS signal.

However, in the above-mentioned communication terminal apparatus, since the DIS signal is detected by judging the flag pattern of the DIS signal, procedure signals having no flag pattern cannot be detected.

Examples of signals having no flag pattern are an AC signal that is transmitted from an answering terminal to a calling terminal based on the communication procedure conforming to Recommendation V.32 or V.32bis as illustrated in FIG. 1 and a USB1 signal that is transmitted from an answering terminal to a calling terminal based on the communication procedure conforming to Recommendation V.22 or V.22bis. Accordingly, the above-mentioned communication terminal apparatus cannot detect such procedure signals. Therefore, in the case where such procedure signals are transmitted from the answering terminal to the calling terminal, the calling terminal continues transmitting the CM signal based on the communication procedure conforming to Recommendation V.8. On the other hand, the answering terminal continues transmitting the USB1 signal based on the communication procedure conforming to Recommendation V.22 or an AC signal based on the communication procedure conforming to Recommendation V.32. As a result, there is the problem that communication operations are looped in the calling terminal and the answering terminal. For example, the above-mentioned AC signal and USB1 signal are signals used in data communications. Since the above-mentioned communication terminal apparatus cannot detect such signals, there is the problem that a data communication cannot be performed in such apparatus.

SUMMARY OF THE INVENTION

An object of the present invention is to provide a modem apparatus, communication control apparatus and communication control method capable of responding to communication procedures specified in an arbitrary Recommendation including a communication procedure conforming to Recommendation V.34, a facsimile communication procedure conforming to Recommendation T.30 and a data communication procedure based on, for example, Recommendation V.22, and of assuredly preventing communication operations in the apparatuses from being looped.

In the present invention, a calling terminal receives a procedure signal conforming to a predetermined Recommendation from an answering terminal, and detects signal components each at one of a plurality of frequencies in parallel from the procedure signal. Based on the detected result of the detected signal components each at one of a plurality of frequencies, the calling terminal outputs an identification signal indicative of a type of Recommendation to a host, and controls the switching between operation modes according to the instruction from the host based on the identification signal.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENT

An embodiment of the present invention is explained specifically below with reference to drawings.

Figure 1:
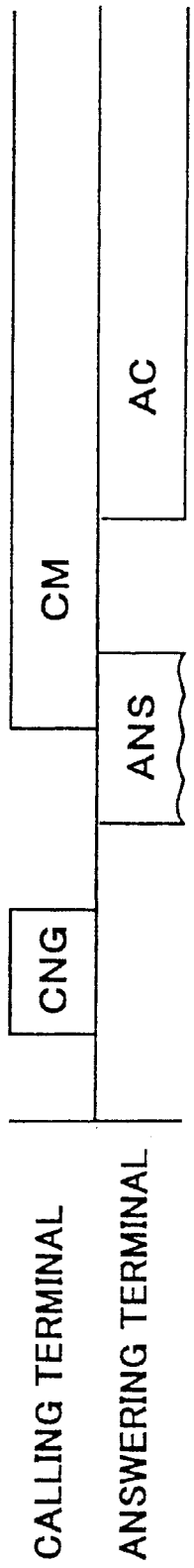
FIG. 1 is a sequence diagram of a conventional communication terminal apparatus.
Figure 1:
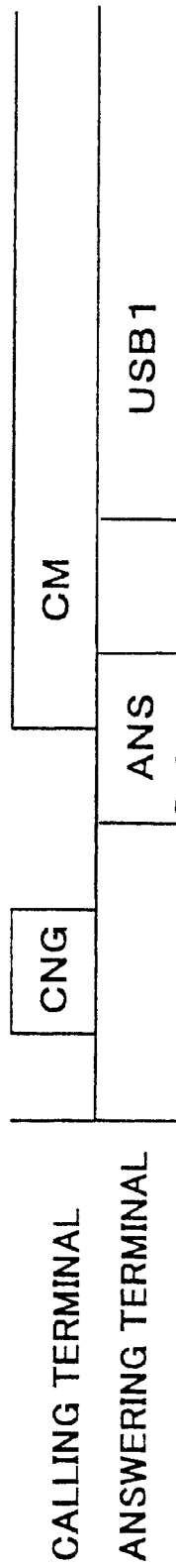
Figure 2:
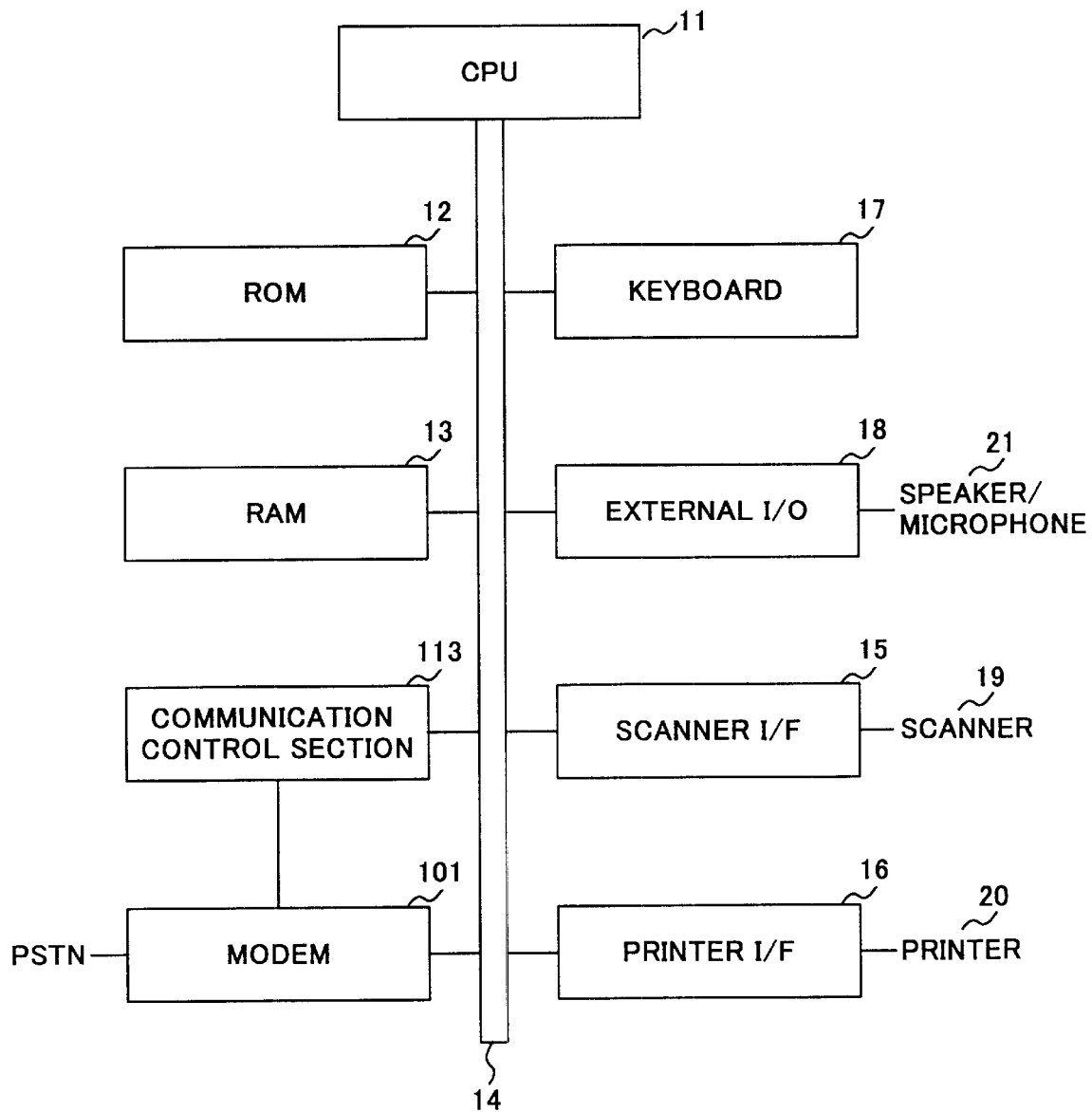
FIG. 2 is a hardware block diagram of a communication terminal apparatus according to an embodiment of the present invention.

FIG. 2 is a hardware block diagram of the communication terminal apparatus 1 according to the above embodiment. Specific examples of the communication terminal apparatus 1 are, for example, a facsimile apparatus, a personal computer or a multifunction apparatus which has a facsimile function, copy function and printer function and so on.

CPU (Central Processing Unit) 11 controls operations of each composition of the communication terminal apparatus 1 by executing various programs stored in ROM 12. RAM 13 is a main-memory, Which is used by CPU 11 in executing the program read from ROM 12 and date.

Scanner I/F 15, printer I/F 16, keyboard 17, external I/O 18 are connected with CPU 11 via bus 14. CPU 11 controls operations of them by executing program stored in ROM 12.

Scanner I/F 15 is an interface connectable to scanner 19. CPU 11 controls the operation of scanner 19 via scanner I/F 15. Scanner 19 scans image date of documents according to control of CPU 11.

Printer I/F 16 is an interface connectable to printer 20. CPU 11 controls the operation of printer 20 via Printer I/F 16. Printer 20 prints out, for example image date received with modem, which is described later, according to control of CPU 11.

Keyboard 17 is for use in receiving instructions from operator of the communication terminal apparatus. The operator operates the communication terminal apparatus by inputting predetermined instructions.

External I/O 18 communicates date with external apparatuses 21, such as a speaker and microphone which input/output date of predetermined speech signals and so on. External I/O 18 is, for example, a serial interface including USB (Universal Serial Bus).

Moreover modem 101 and communication control section 113 are connected with CPU 11 via bus 14. CPU 11 controls operations of them by executing program stored in ROM 12.

Modem 101 controls transmission/reception of date and signals between public switched telephone networks (PSTN). Modem 101 is provided with a variable signal detection section, which is capable of calculating an integrated value of a signal component at a specific carrier frequency. This variable signal detection section is described later.

Communication control section 113 works as a host of modem 101 (hereinafter, Communication control section is refer to as host). Host 113 controls date communication and facsimile communication via the PSTN, by controlling modem 101.

Host 113 is provided with a detection frequency table that is used in setting frequency detectable by the variable signal detection section of modem 101. Host 113 is further provided with a communication capability table that is used in setting communication capabilities of the communication terminal apparatus 1. Host 113 is provided with the detection frequency table and communication capability table according to one embodiment of the present invention, however it may be possible to provide RAM 13 with these tables.

Figure 3:
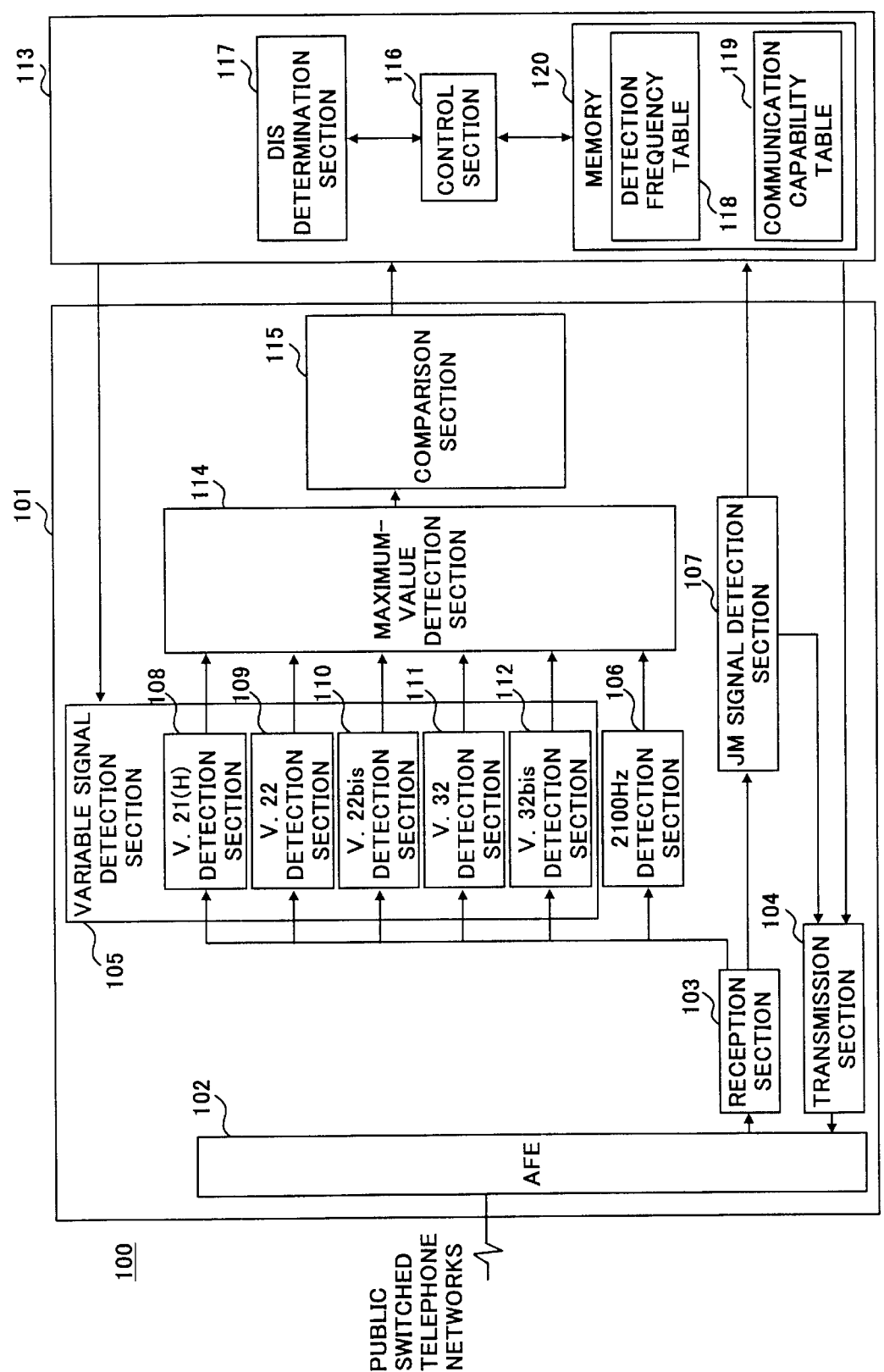
FIG. 3 is a block diagram of a communication control unit of the communication terminal apparatus according to an embodiment of the present invention.

FIG. 3 is a block diagram of a communication control unit 100 comprised with the above-mentioned modem 101 and host 113. In this embodiment, this communication terminal apparatus 100 has the function of performing communications based on communication procedures conforming to Recommendation V.8 and Recommendation V.34.

In FIG. 3, modem 101 is comprised of DSP (Digital Signal Processor) and controls operations of, for example, internal signals by itself. Modem 101 is connected to a PSTN (Public Switched Telephone Networks) through AFE (Analog Front End) 102. AFE 102 is connected to reception section 103 that receives, for example, signals from the PSTN and transmission section 104 that transmits, for example, signals to the PSTN. Reception section 103 is connected to variable signal detection section 105, detection section 106 that detects a signal of 2100 Hz (hereinafter, referred to as 2100 Hz detection section) and JM signal detection section 107. JM signal detection section 107 is also connected to transmission section 104.

Variable signal detection section 105 has a plurality of band pass filters each capable of calculating an integrated value of a signal component at a specific carrier frequency. A host, described later, sets the integrated value of the signal component at the specific carrier frequency to be calculated at each of the band pass filters. Hereinafter, in the case where the host sets an integrated value of a signal component at a carrier frequency of a high channel in Recommendation V.21 (hereinafter, referred to as Recommendation V.21(H)) at one of the band pass filters, the band pass filter is referred to as V21(H) detection section 108. Variable signal detection section 105 calculates the integrated value of the signal components at carrier frequency set by the host as described above. FIG. 2 illustrates the case where the host sets other band pass filters as V.22 detection section 109, V.22bis detection section 110, V.32 detection section 111, and V.32bis detection section 112 besides V.21(H) detection section 108.

Figure 4:
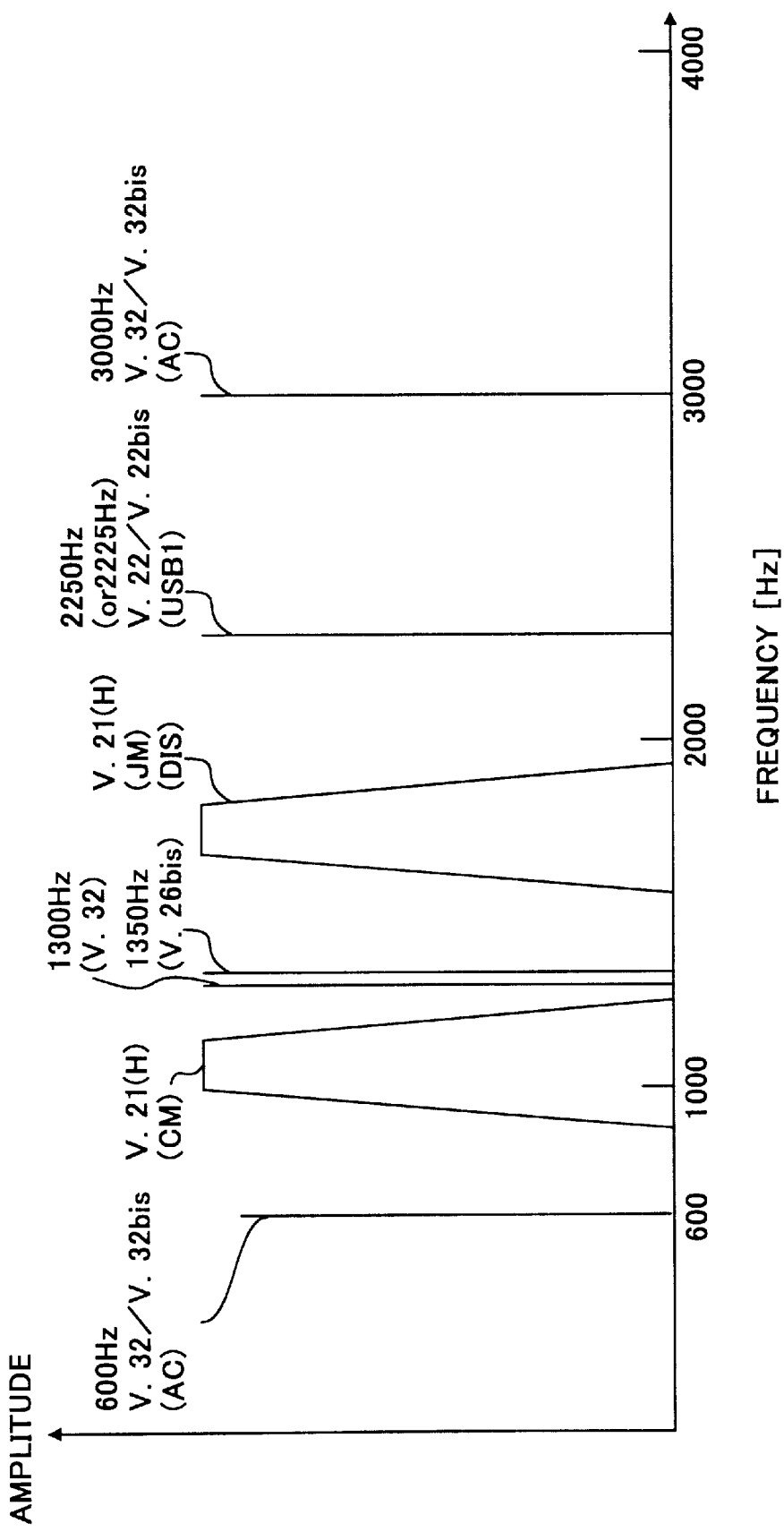
FIG. 4 is a diagram illustrating carrier frequencies at which signal components can be calculated in a variable signal detection section in the communication control unit of the communication terminal apparatus according to the above embodiment.

FIG. 4 illustrates specific carrier frequencies at which signal components can be calculated in variable signal detection 105 that is set as illustrated in FIG. 3. V.21(H) detection section 108 calculates the integrated value of the signal component at a carrier frequency of 1750 Hz used in Recommendation V.21(H). Specifically, V.21(H) detection section 108 calculates the integrated value of the signal component at the carrier frequency of the JM signal that is transmitted from an answering terminal to a calling terminal in Recommendation V.8, and the integrated value of the signal component at the carrier frequency of the DIS signal that is transmitted from an answering terminal to a calling terminal in Recommendation T.30.

V.22 detection section 109 and V.22bis detection section 110 each calculates an integrated value of a signal component at a carrier frequency of 2250 Hz used in Recommendation V.22 and Recommendation V.22bis. Specifically, V.22 detection section 109 and V.22bis detection section 110 each calculates the integrated value of the signal component at the carrier frequency of the USB1 signal that is transmitted from an answering terminal to a calling terminal in Recommendation V.22 and Recommendation V22bis. In addition, Recommendation V.22 and Recommendation V22bis are both Recommendations for use in performing data communications. The USB1 signal is the procedure signal transmitted from the answering terminal to the calling terminal in the case where data communications are performed.

V.32 detection section 111 and V.32bis detection section 112 each calculates integrated values of signal components at carrier frequencies of 600 Hz and 3000 Hz used in Recommendation V.32 and Recommendation V.32bis. Specifically, V.32 detection section 111 and V.32bis detection section 112 each calculates the integrated values of the signal components at the carrier frequencies of the AC signal that is transmitted from an answering terminal to a calling terminal in Recommendation V.32 and Recommendation. In addition, Recommendation V.32 Recommendation V.32bis are both Recommendations for use in performing data communications. The AC signal is the procedure signal transmitted from the answering terminal to the calling terminal in the case where data communications are performed.

In addition, variable signal detection section 105 can calculate integrated values of signal components at carrier frequencies used in other Recommendations. For example, as illustrated in FIG. 4, when a band pass filter of variable signal detection section 105 is set to calculate an integrated value of a signal component at a carrier frequency of 1300 Hz, it is possible to calculate the integrated value of the signal component at the carrier frequency used in Recommendation V.23. Further, when a band pass filter of variable signal detection section 105 is set to calculate an integrated value of a signal component at a carrier frequency of 1350 Hz, it is possible to calculate the integrated value of the signal component at the carrier frequency used in Recommendation V.26bis. 2100 Hz detection section 106 calculates an integrated value of a signal component of a carrier frequency of 2100 Hz. Specifically, 2100 Hz detection section 106 calculates the integrated value of the signal component at the carrier frequency of, for example, the ANSam signal that is transmitted from an answering terminal to a calling terminal in Recommendation V.8 or the CED signal that is transmitted from an answering terminal to a calling terminal in Recommendation T.30.

JM signal detection section 107 analyzes a received signal received in reception section 103. JM signal detection section 107 detects the JM signal when the received signal is the JM signal. When JM signal detection section 107 detects the JM signal, JM signal detection section 107 notifies host 113 and transmission section 104 that the JM signal is detected.

Detection sections 108 to 112 set in variable signal detection section 105 and 2100 Hz detection section 106 are each connected to maximum-value detection section 114. Maximum-value detection section 114 detects a maximum value from among integrated values of signal components at carrier frequencies calculated in detection sections 108 to 112 and 2100 Hz detection sections. Specifically, maximum-value detection section 114 compares the respective integrated values of signal components at carrier frequencies calculated in detection sections 108 to 112 set in variable signal detection section 105 and 2100 Hz detection section 106 to each other to detect the maximum value of the integrated value of the signal component at the carrier frequency. In addition, maximum-value detection section 114 is connected to comparison section 115.

Comparison section 115 has predetermined thresholds registered thereto for each integrated value of the signal component at the carrier frequency. Comparison section 115 compares the maximum value detected in maximum-value detection section 114 to the registered threshold. When the maximum value exceeds the predetermined threshold, comparison section 115 detects an identification signal indicative of the detection section that calculates the maximum value, and based on the identification signal, notifies host 113 of a type of the received signal.

Host 113 is provided with control section 116 that controls the whole operations of communication control unit 100. Host 113 is further provided with DIS determination section 117 that determines whether or not the received signal notified from modem 101 is the DIS signal, and memory 120 in which detection frequency table 118 and communication capability table 119 are stored.

DIS determination section 117 has V.21(H) reception counter 117A that counts the number of reception times of the procedure signal specified in Recommendation V.21(H) from the answering terminal, and non-signal counter 117B that counts the number of times of the state in which a signal is not received from the answering terminal at all. DIS determination section 117 further has ON→OFF OFF→ON flag 117C indicative of the state of ON or OFF of an energy of a signal transmitted from the answering terminal. DIS determination section 117 furthermore has V.21(H) ON→OFF counter 117D and V.21(H) OFF→ON counter 117E that count the number of switching of ON→OFF OFF→ON flag 117C. Using these counters and the flag, DIS determination section 117 determines whether or not the received signal notified from modem 101 is the DIS signal.

Detection frequency table 118 is a table for use by control section 116 in setting a band pass filter of variable signal detection section 105 in modem 101. Communication capability table 119 is a table for use by control section 116 in setting the CM signal that notifies the answering terminal of communication capabilities of communication control unit 100.

Next, operations of the communication control unit with the above-mentioned configuration are explained for the modem and host thereof separately. First, the operations of modem 101 are explained using flow charts in FIG. 5 and FIG. 6. It is assumed in this embodiment that communication terminal apparatus 100 is a calling terminal.

Figure 5:
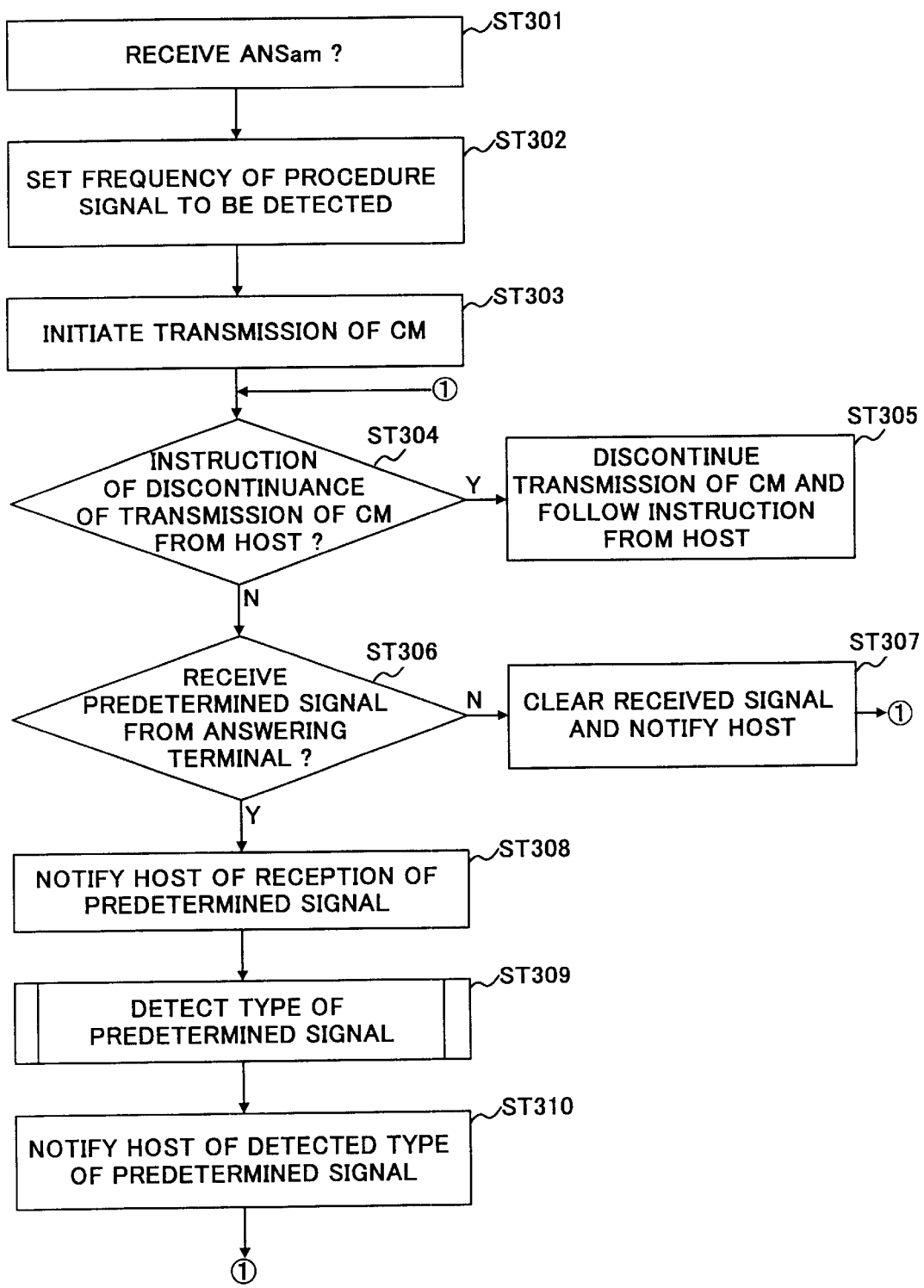
FIG. 5 is a flow chart to explain operations of a modem of the communication control unit of the communication terminal apparatus according to the above embodiment.

As illustrated in FIG. 5, when communication control unit 100 initiates a communication according to a sequence specified in Recommendation V.8, modem 101 of communication control unit 100 receives the ANSam signal transmitted from an answering terminal (ST301). When modem 101 receives the ANSam signal, modem 101 notifies host 113 that the ANsam signal is received.

When control section 116 of host 113 receives the notification, control section 116 instructs modem 101 to set a band pass filter in variable signal detection section 105. According to the instruction, modem 101 sets the band pass filter in variable signal detection section 105 (ST302).

Next, control section 116 of host 113 instructs transmission section 104 of modem 101 to initiate the transmission of the CM signal. According to the instruction, transmission section 104 initiates the transmission of the CM signal (ST303).

When transmission section 104 initiates the transmission of the CM signal modem 101 directs whether or not host 113 instructs to discontinue the transmission of the CM signal (ST304). The discontinuance of the transmission of the CM signal is instructed from host 113 in the following cases. For example, in the case where a predetermined time passes with no response from the answering terminal after modem 101 transmits the CM signal, or in the case where there is no need to transmit the CM signal any more because of receiving the JM signal specified in Recommendation V.8 or the USB1 signal specified in Recommendation V.22 from the answering terminal, host 113 instructs to discontinue the transmission of the CM signal.

When there is the instruction for discontinuing the transmission of the CM signal from host 113, modem 101 discontinues the transmission of the CM signal to follow the instruction of host 113 (ST305). When there is no instruction for discontinuing the transmission of the CM signal from host 113, modem 101 directs whether or not a predetermined signal is received from the answering terminal (ST306). In addition, the predetermined signal is one of signals of which the integrated value at the carrier frequency can be calculated in variable signal detection section 105 set at ST302. Specifically, the predetermined signals in FIG. 5 are procedure signals specified in Recommendation V.21(H), a procedure signal specified in Recommendation V.22(V22bis), procedure signals specified in Recommendation V.32 (V.32 bis), and a procedure signal with a carrier frequency of 2100 Hz.

When the predetermined signal is not received for a predetermined period, modem 101 clears signals other than the predetermined signal received in the predetermined period. Then, modem 101 notifies host 113 that the predetermined signal is not received in the predetermined period (ST307). By thus clearing the signals other than the predetermined signal received in the predetermined period, it is possible to prevent the misconception of the predetermined signal to be received originally.

On the other hand, when the predetermined signal is received from the answering terminal, modem 101 notifies host 113 that the predetermined signal is received (ST308). Modem 101 detects a type of the received predetermined signal after notifying host 113 that the predetermined signal is received (ST309). Then, modem 101 notifies host 113 of the detected d type e of the predetermined signal (ST310). Modem 101 returns the next step to ST304 after notifying host 113 of the type of the predetermined signal. Then, modem 101 waits for the instruction of discontinuance of the transmission of the CM signal.

Figure 6:
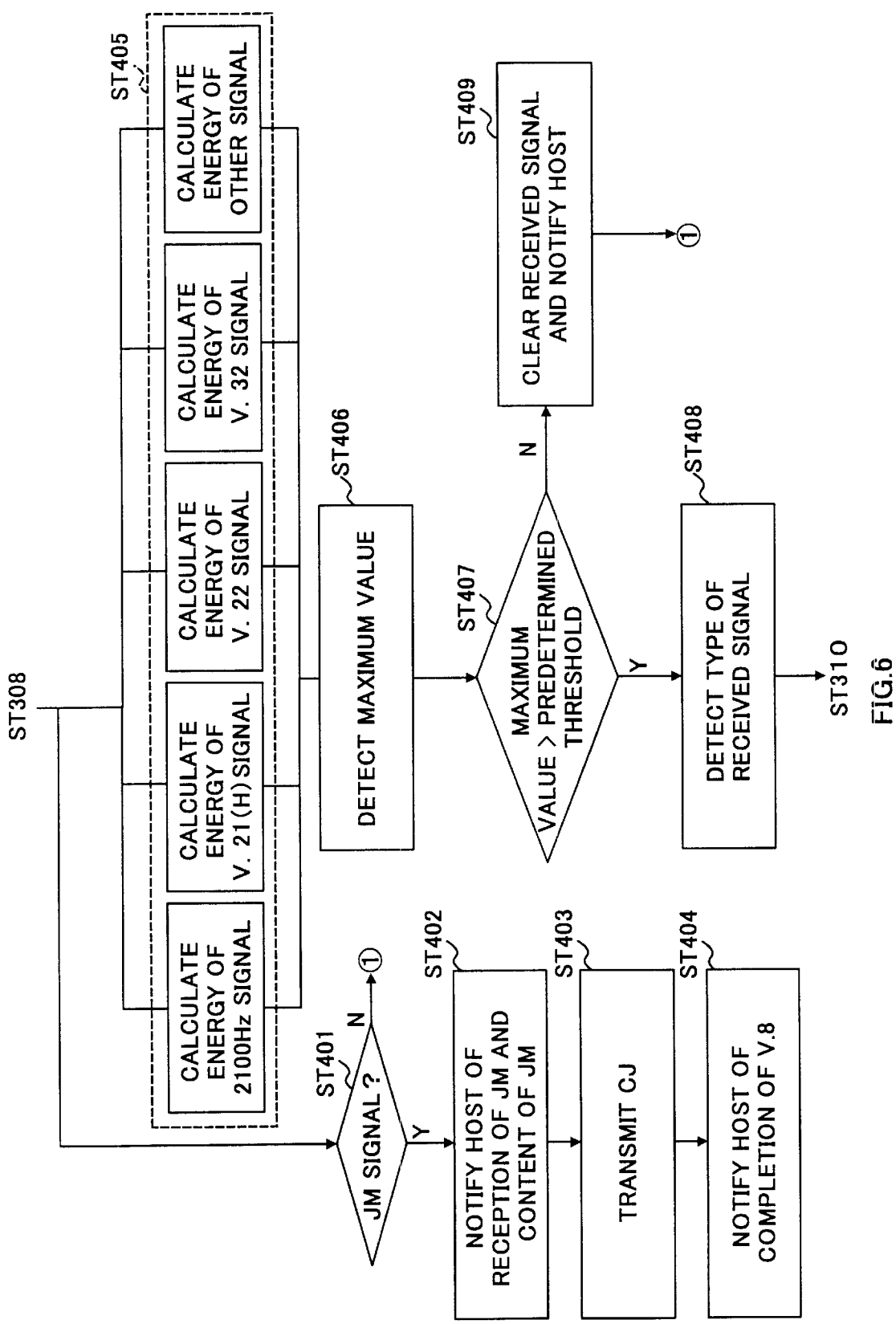
FIG. 6 is a flow chart to explain operations of the modem of the communication control unit of the communication terminal apparatus according to the above embodiment.

Next, the flow at ST309 for detecting the type of the predetermined signal received by modem 101 is explained using FIG. 6. As illustrated in FIG. 6, reception section 103 of modem 101 provides the received predetermined signal to JM signal detection section 107, each of detection sections 108 to 112 set in variable signal detection section 105, and 2100 Hz detection section 106 concurrently.

The following description first explains about operations of modem 101 in the case where the predetermined signal received from the answering terminal is the JM signal. As described above, the predetermined signal is provided to JM signal detection section 107, each of detection sections 108 to 112 set in variable signal detection section 105, and 2100 Hz detection section 106 concurrently.

When the JM signal detection section 107 receives the predetermined signal, JM signal detection section 107 analyzes the predetermined signal. Then, in the case where the predetermined signal is the JM signal, JM signal detection section 107 detects the JM signal (ST401).

In the case where JM signal detection section 107 detects the JM signal, JM signal detection section 107 notifies host 113 that the JM signal is received (ST402). In this case, JM signal detection section 107 notifies transmission section 104 that the JM signal is received. When transmission section 104 receives this notification, transmission section 104 discontinues the transmission of the CM signal to the answering terminal, and transmits the CJ signal based on Recommendation V.8 to the answering terminal (ST403). After transmitting the CJ signal to the answering terminal, modem 101 notifies host 113 that the communication procedure based on Recommendation V.8 is completed (ST404). Host 113 recognizes that the communication procedure based on Recommendation V.8 is completed, selects the most appropriate communication procedure from among communication capabilities that communication terminal apparatus 100 and the answering terminal both have (for example, the communication procedure based on Recommendation V.34), and according to the selected communication procedure, initiates a communication.

On the other hand, when detection sections 108 to 112 set in variable signal detection 105 and 2100 Hz detection section 106 receive a predetermined signal, detection sections 108 to 112 set in variable signal detection 105 and 2100 Hz detection section 106 each calculates an integrated value of a received signal at a respective carrier frequency (ST405). Then, detection sections 108 to 112 set in variable signal detection 105 and 2100 Hz detection section 106 each outputs the calculated integrated value to maximum-value detection section 114.

Maximum value detection section 114 compares the received integrated values to each other to detect the maximum value (ST406). At this point, modem 101 has received the JM signal from the answering terminal. JM signal is the procedure signal based on Recommendation V.21(H). Therefore, maximum-value detection section 114 detects the integrated value calculated by V.21(H) detection section 108 as the maximum value. Maximum-value detection section 114 outputs the detected maximum value to comparison section 115.

Comparison section 115 compares the received maximum value to the registered threshold (ST407). In other words, comparison section 115 compares the integrated value calculated by V.21(H) detection section 108 to the predetermined threshold. When the predetermined signal received from the answering terminal is the JM signal, the integrated value calculated by V.21(H) detection section 108 exceeds the predetermined threshold. Since the received maximum value exceeds the threshold, comparison section 115 detects an identification signal indicative of the detection section that calculates the maximum value exceeding the threshold. Accordingly, comparison section 115 detects the identification signal indicative of V.21(H) detection section 108 (ST408). At this point, modem 101 shifts the next step to ST310. Based on the identification signal, comparison section 115 notifies host 113 of the type of the predetermined signal.

Accordingly, host 113 receives the notifications both indicating that the JM signal is received through JM signal detection 107 and V.21(H) detection section 108. However, host 113 actually operates after receiving the earlier notification indicating that the JM signal is received. The notification indicating that the JM signal is received is notified to host 113 from JM signal detection section 107 earlier. Therefore, host 13 operates after receiving the notification from JM signal detection section 107.

Generally, as described above, communication control unit 100 receives the JM signal from the answering terminal, and selects the most appropriate communication procedure for communicating with the answering terminal to initiate a communication. However, the case occurs where communication control unit 100 receives the signal other than the JM signal from the answering terminal. The following description explains about operations of modem 101 in the case where the predetermined signal received from the answering terminal is not the JM signal. In the same way as in the case where the predetermined signal is the JM signal, the predetermined signal is provided to JM signal detection section 107, detection sections 108 to 112 set in variable signal detection section 105, and 2100 Hz detection section 106 concurrently.

The predetermined signal that JM signal detection section 107 received is analyzed, and in the case where the predetermined signal is not the JM signal, modem 101 returns the next step to ST304. Then, modem 101 again waits for the instruction of the discontinuance of the transmission of the CM signal from host 113.

On the other hand, when each of detection sections 108 to 112 set in variable signal detection section 105, and 2100 Hz detection section 106 receive the predetermined signal, modem 101 performs the same operations of ST405 to ST408 as in the above-described case where the JM signal is received. At this point, modem 101 shifts the next step to ST310. Comparison section 115 notifies the kind of the predetermined signal to host 113 based on the identification signal.

In addition, when the maximum value received from maximum-value detection section 114 does not exceed the predetermined threshold at ST407, modem 101 clears the received signal, and notifies host 113 that the maximum value received from maximum-value detection section 114 does not exceed the predetermined threshold (ST409). Clearing the maximum value that does not exceed the predetermined threshold prevents modem 101 from malfunctioning. Modem 101 returns the next step to ST304 after notifying host 113 that the maximum value received from maximum-value detection section 114 does not exceed the predetermined threshold. Then, modem 101 waits for the instruction of the discontinuance of the transmission of the CM signal from host 113.

The next description explains specifically about the case where the predetermined signal received from the answering terminal is a signal other than the JM signal. As a specific example of the above case, there is the case where despite the answering terminal not having the function for performing the communication procedure based on Recommendation V.8, the calling terminal recognizes the signal received from the answering terminal as the ANSam signal. For example, when the answering terminal has the communication capabilities based on Recommendation V.32, despite the signal received from the answering terminal being the ANS signal specified in Recommendation V.32, the case occurs where modem 101 incorrectly recognizes the ANS signal as the ANSam signal. Herein, it is assumed that communication control unit 100 has the communication capabilities based on Recommendation V.32.

Even in the case where modem 101 incorrectly recognizes that the ANSam signal is received from the answering terminal, the setting of the band pass filters of variable signal detection section 105 is performed in the same procedure as in the above-described case (ST302), and the transmission of the CM signal is initiated to the answering terminal (ST303). At this point, the setting of band pass filters in variable signal detection section 105 is performed so as to calculate an integrated value of a signal component at the carrier frequency of the AC signal specified in Recommendation V.32.

Even when the CM signal is transmitted, since the answering terminal is a communication terminal with the communication function based on Recommendation V.32, the JM signal is not transmitted from the answering terminal. The answering terminal transmits the AC signal to communication control unit 100. In communication control unit 100, the AC signal is set as the predetermined signal. Therefore, when modem 101 receives the AC signal (ST306), modem 101 notifies host 113 that the predetermined signal is received (ST308).

The predetermined signal is provided to JM signal detection section 107, each of detection sections 108 to 112 set in variable signal detection section 105, and 2100 Hz detection section 106 concurrently. JM signal detection section 107 analyzes the predetermined signal. However, since the predetermined signal is not the JM signal, modem 101 returns the next step to ST304. On the other hand, each of detection sections 108 to 112 set in variable signal detection section 105, and 2100 Hz detection section 106 each calculates the integrated value of the predetermined signal at the respective carrier frequency (ST405). Then, each of detection sections 108 to 112 set in variable signal detection section 105 and 2100 Hz detection section 106 each outputs the calculated integrated value to maximum-value detection section 114.

Maximum value detection section 114 compares the received integrated values to each other to detect the maximum value (STS406). At this point, modem 101 receives the AC signal from the answering terminal. Therefore, maximum-value detection section 114 detects as the maximum value the integrated value of the signal at the carrier frequency of the AC signal calculated by V.32 detection section 111. Maximum-value detection section 114 outputs the detected maximum value to comparison section 115.

Comparison section 115 compares the received integrated value of the signal at the carrier frequency of the AC signal to a registered threshold (ST407). Since the answering terminal transmits the AC signal, the integrated value of the signal at the carrier frequency of the AC signal calculated by V.32 detection section 111 exceeds the predetermined threshold. Since the received maximum value exceeds the predetermined threshold, comparison section 115 detects the identification signal indicative of the detection section that calculates the maximum value exceeding the threshold value (ST408). Accordingly, comparison section 115 detects the identification signal indicative of V.32 detection section 111. At this point, modem 10 shifts the next step to ST310. Comparison section 115 notifies host 113 of the kind of the predetermined signal, based on the identification signal. Accordingly, comparison section 115 notifies host 113 of the AC signal, based on the identification signal.

Figure 7:
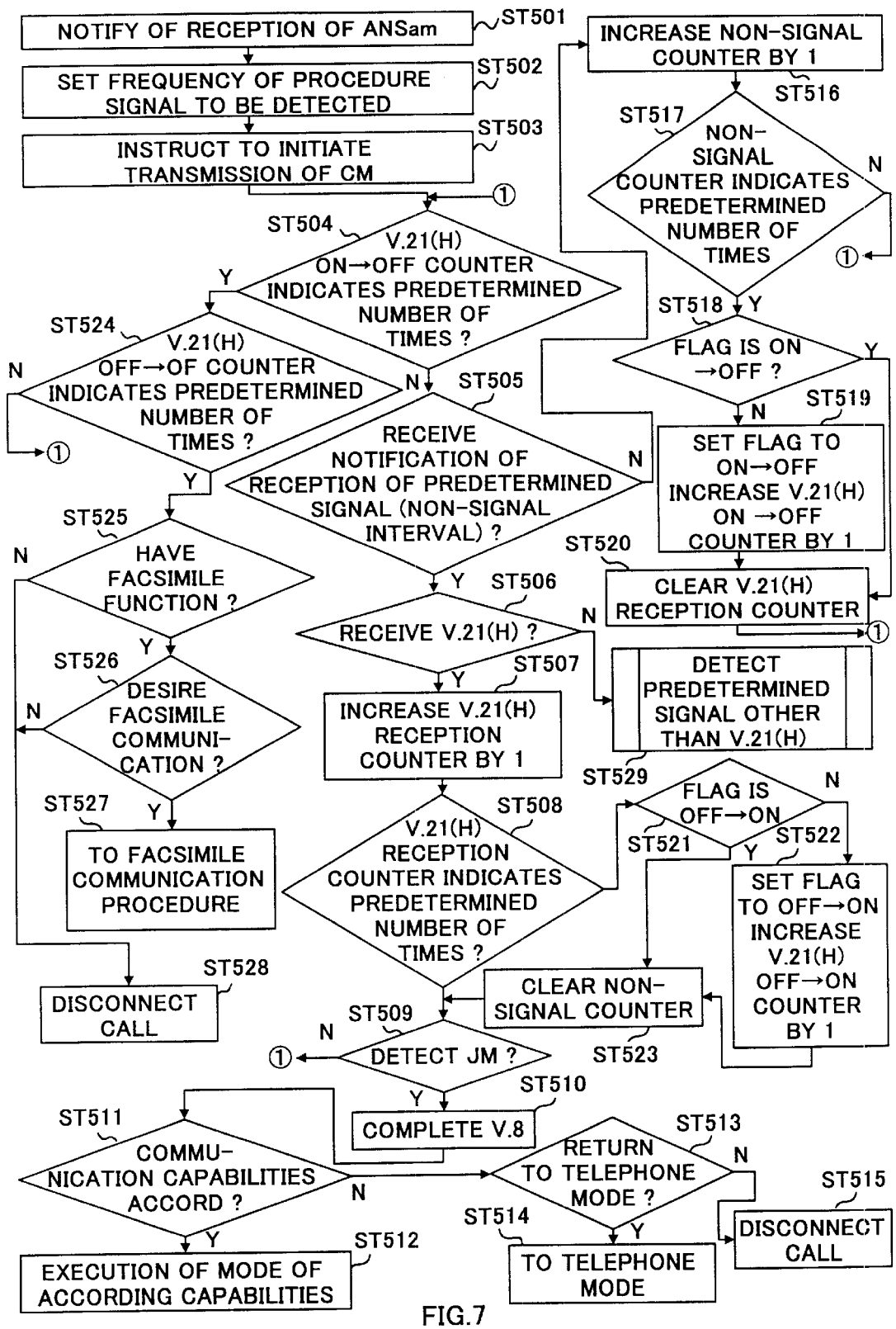
FIG. 7 is a flow chart to explain operations of a host of the communication control unit of the communication terminal apparatus according to the above embodiment.
Figure 8:
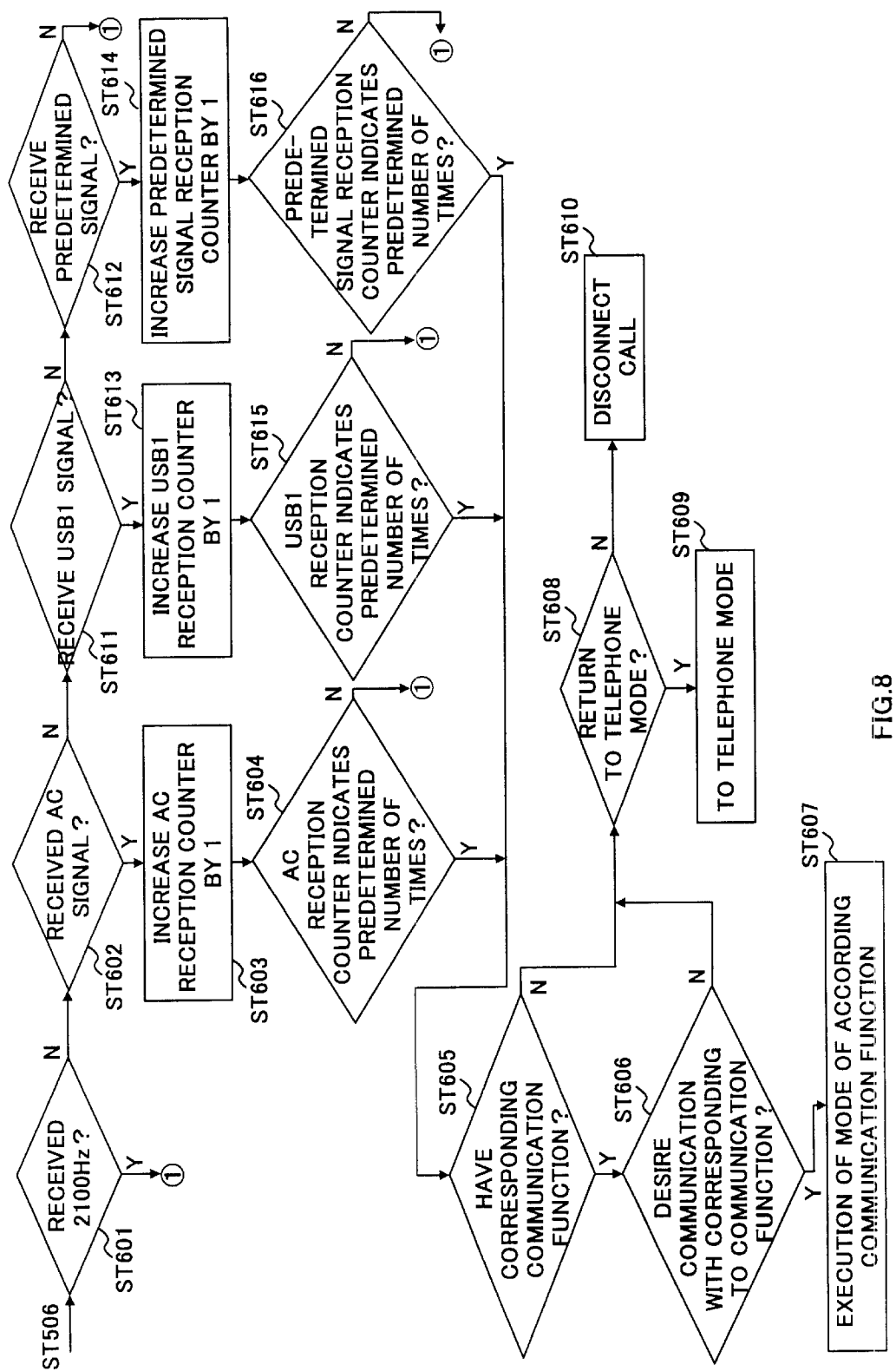
FIG. 8 is a flow chart to explain operations of the host of the communication control unit of the communication terminal apparatus according to the above embodiment.

The next description explains about operations of host 113 using flow charts in FIG. 7 and FIG. 8. In the following, the explanations are separated into the cases where an answering terminal is a communication terminal apparatus with the communication capabilities based on Recommendation V.8, and where an answering terminal is a communication terminal apparatus without the communication capabilities based on Recommendation V.8. In the case where the answering terminal is the communication terminal apparatus with the communication capabilities based on Recommendation V.8, reception section 103 of modem 101 receives the JM signal from the answering terminal. In the case where the answering terminal is the communication terminal apparatus without the communication capabilities based on Recommendation V.8, reception section 103 of modem 101 receives a signal other than the JM signal from the answering terminal. The first explanation is given of the case where the answering terminal is the communication terminal apparatus with the communication capabilities based on Recommendation V.8.

As illustrated in FIG. 7, when communication control unit 100 initiates a communication according to the sequence specified in Recommendation V.8, modem 101 of communication control unit 100 receives the ANSam signal transmitted from the answering terminal. Host 113 receives from modem 101 the notification indicating that the ANSam signal is received (ST501).

When control section 116 of host 113 receives the notification, control section 116 instructs modem 101 to set the band pass filters in variable signal detection section 105 (ST502). Specifically, control section 116 refers to detection frequency table 118 in memory 120, and instructs to set a carrier frequency of the procedure signal based on the communication capabilities to which communication control unit 100 can response, or other carrier frequency of the procedure signal based on the communication capabilities to which communication control unit 100 cannot response.

Such a setting is performed to prevent the operations of communication control unit 100 from being looped in the case where the ANSam signal received from the answering terminal is the misconception.

In other words, in the case where the carrier frequency of the procedure signal based on the communication capabilities to which communication control unit 100 can response is set, communication terminal apparatus 100 detects the procedure signal that is originally transmitted from the answering terminal without recognizing the procedure signal incorrectly as another procedure signal. Then, when the carrier frequency of the procedure signal agrees with the carrier frequency set in communication control unit 100, the communication with the answering terminal is restored with the communication capabilities using the procedure signal.

Further, in the case where the carrier frequency of the procedure signal based on the communication capabilities to which communication control unit 100 cannot response is set, communication control unit 100 detects the procedure signal that is originally transmitted from the answering terminal without recognizing the procedure signal incorrectly as another procedure signal, in the same way as in the abovementioned case. Then, when the carrier frequency of the procedure signal agrees with the carrier frequency set in communication control unit 100, since communication terminal apparatus 100 cannot perform communications with the answering terminal with the communication capabilities using the procedure signal, communication terminal apparatus 100 disconnects the channel with the answering terminal. It is thereby intended to reduce communication cost.

Next, control section 116 instructs transmission section 104 of modem 101 to transmit the CM signal (ST503). Specifically, control section 116 sets the content of the CM signal referring to communication capability table 119 in memory 120, and then instructs to transmit the CM signal to the answering terminal. At this point, the CM signal is set to response to the setting of variable signal detection section 105 set at ST502. In other words, the CM signal is set to agree with the communication capabilities to which communication control unit 100 can response set in variable signal detection section 105.

Next, control section 116 determines whether or not a count value of V.21(H) ON→OFF counter 117D of DIS determination section 117 indicates a predetermined number of times (ST504). V.21(H) ON→OFF counter 117D indicates the predetermined number of times when reception section 103 of modem 101 receives the DIS signal. Therefore, in the case where the JM signal is received, V.21(H) ON→OFF counter 117D does not indicate the predetermined number of times.

Since V.21(H) ON→OFF counter 117D does not indicate the predetermined number of times, control section 116 determines whether or not there is the notification indicating that the predetermined signal is received from modem 101 (ST505). At this point, control section 116 has received from modem 101 the notification indicating that the JM signal that is the predetermined signal is received.

Since control section 116 has received from modem 101 the notification indicating that the JM signal is received, control section 116 determines whether or not the JM signal is the procedure signal specified in Recommendation V.21 (H) (ST506). Herein, the JM signal is the procedure signal specified in Recommendation V.21(H).

Since the received JM signal is the procedure signal specified in Recommendation V.21(H), control section 116 increases a count value of V.21 reception counter 117A by one (ST507).

After increasing the count value of V.21(H) reception counter 117A by one, control section 116 determines whether or not the count value of V.21(H) reception counter 117A indicates the predetermined number of times (ST508). V.21(H) reception counter 117A indicates the predetermined number of times in the case where reception section 103 of modem 101 receives the DIS signal. Therefore, in the case where reception section 103 receives the JM signal, V.21(H) reception counter 117A does not indicate the predetermined number of times.

Since the count value of V.21(H) reception counter 117A does not indicate the predetermined number of times, control section 116 determines whether or not to have received the notification indicating that the JM signal is detected from JM signal detection section 107 of modem 101 (ST509). At this point, control section 116 has received the notification indicating that the JM signal is received from modem 101. Therefore, control section 116 completes the communication procedure based on Recommendation V.8 (ST510).

When control section 116 completes the communication procedure based on Recommendation V.8, control section 116 examines the communication capabilities of the answering terminal included in the JM signal received from the answering terminal. Then, control section 106 determines whether the communication capabilities that the answering terminal has accords with those communication control unit 100 has (ST511).

When the communication capabilities that the answering terminal has accords with those communication control unit 100 has, control section 116 controls communication control unit 100 to perform communications based on the according communication capabilities (ST512). Herein The communication procedure based on the according communication capabilities is, for example, The communication procedure based on Recommendation V.90, Recommendation V.91 or Recommendation V.92, and so on. Control section 116 controls communication control unit 100 to perform communications with the answering terminal.

On the other hand, when the communication capabilities that the answering terminal has does not accord with those communication control unit 100 has, control section 116 determines whether communication control unit 100 has the setting for returning to a telephone mode (ST513).

When the return to the telephone mode is set, control section 116 controls communication control unit 100 to return to the telephone mode (ST514). When the return to the telephone mode is not set, control section 116 discontinues the communication channel connected to the answering terminal (ST515).

The next description explains about the case where the answering terminal is a communication terminal apparatus with the communication capabilities based on Recommendation T.30 in the case where the answering terminal is a communication terminal apparatus without the communication capabilities based Recommendation V.8. Specifically, the following description explains about the case where despite the answering terminal transmitting the CED signal specified in Recommendation T.30 in response to the call placed from communication control unit 100, communication control unit 100 incorrectly recognizes the CED signal as the ANSam signal.

In this case, control section 116 of host 113 performs the control according to ST501 to ST504 in the same procedure as in the case where the ANSam signal is received. At this point, at ST504, V.21(H) ON→OFF counter 117D is at an initial state, and does not indicate the predetermined number of times.

Next, control section 116 determines whether or not there is the notification from modem 101 indicating that the predetermined signal is received (ST505). Since the answering terminal is the communication terminal apparatus with the communication capabilities based on Recommendation T.30, the answering terminal transmits the DIS signal to communication control unit 100 after transmitting the CED signal.

Figure 9:
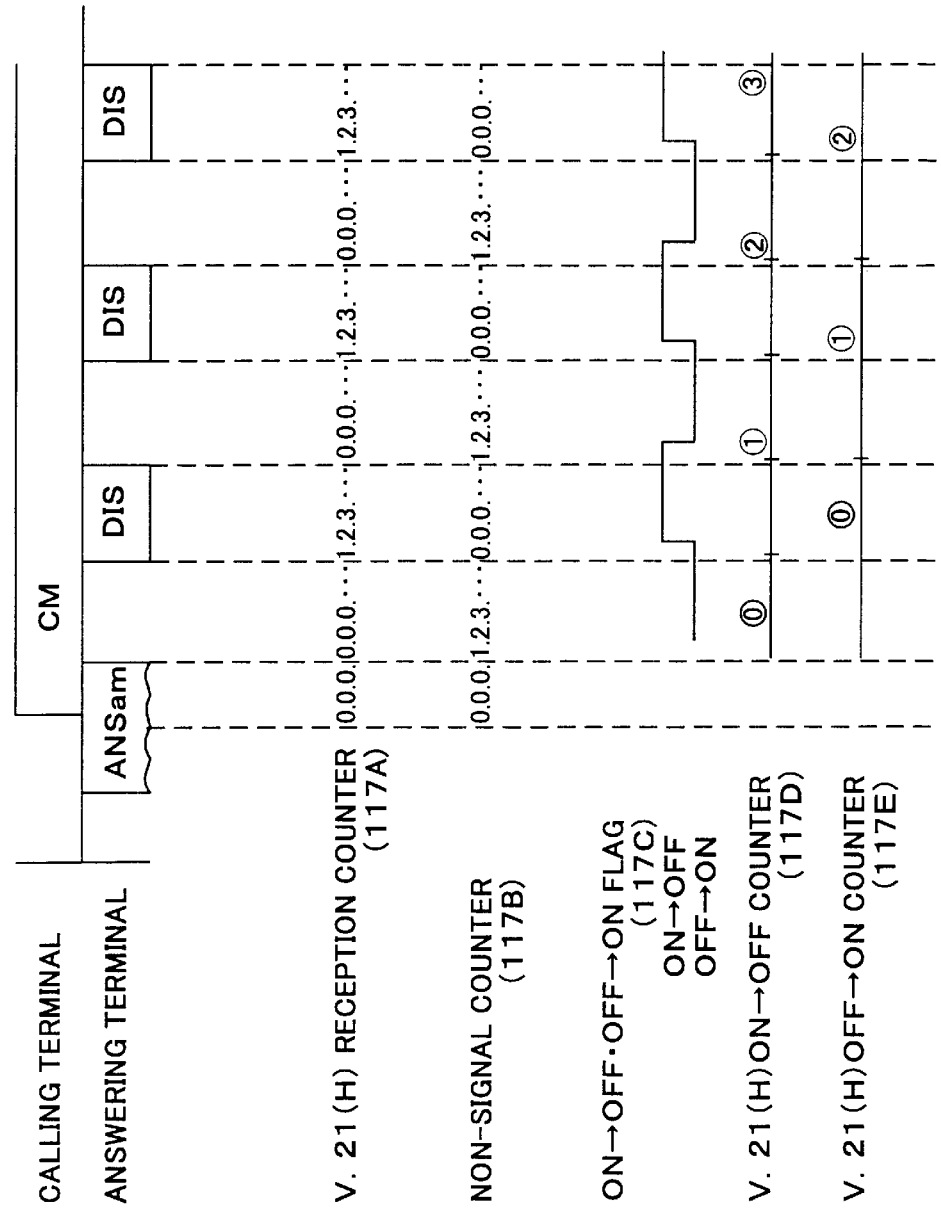
FIG. 9 is a diagram illustrating characteristics of a DIS signal to be judged by the host of the communication control unit of the communication terminal apparatus according to the above embodiment.

Herein, the signal characteristics of the DIS signal are explained. In the case where an answering terminal transmits the DIS signal, as illustrated in FIG. 9, the answering terminal repeats alternately an interval for transmitting the DIS signal and another interval with no signals to communication control unit 100. Specifically, in the case where the answering terminal transmits the DIS signal, the answering terminal transmits the DIS signal to communication terminal apparatus 100 after the interval in which a signal is not transmitted to communication control unit 100 (hereinafter, referred to as "non-signal interval"). Then, the answering terminal repeats the non-signal interval and the transmission of the DIS signal.

Accordingly, in the case where the DIS signal is received from the answering terminal, modem 101 receives the DIS signal after the non-signal interval passes. Modem 101 notifies control section 116 that there is the non-signal interval. When control section 116 receives this notification (ST505), control section 116 increases a count value of non-signal counter 117B of DIS determination section 117 by one (ST516).

After increasing the count value of non-signal counter 117B by one, control section 116 determines whether or not the count value of non-signal counter 117B indicates the predetermined number of times (ST517). In the case where the count value of non-signal counter 117B does not indicate the predetermined number of times, control section 117 repeats the operations at ST504, ST505, ST516 and ST517 until the count value of non-signal counter 117B indicates the predetermined number of times. In addition, the count value of non-signal counter 117B is set to indicate the predetermined number of times by one non-signal interval. The reason for shifting the operation to the next step when the count value of non-signal counter 117B indicates the predetermined number of times is to prevent the malfunction of host 113 due to the misconception of non-signal interval.

In the case where non-signal counter 117B indicates the predetermined number of times, control section 116 determines the state of ON→OFF OFF→ON flag 117C in DIS determination section 117 (ST518). At this point, when the state of ON→OFF OFF→ON flag 117C is not ON→OFF, control section 116 switches the state of ON→OFF OFF→ON flag 117C to ON→OFF. Further, control section 116 increases the count value of V.21(H) ON→OFF counter 117D in DIS determination section 117 by one (ST519).

After increasing the count value of V.21(H) ON→OFF counter 117D by one, control section 116 clears the count value of V.21(H) reception counter 117A in DIS determination section 117 (ST520). Further, when the state of ON→OFF OFF→ON flag 117C is determined (ST518), in the case where the state of ON→OFF OFF→ON flag 117C is ON→OFF, control section 116 also clears the count value of V.21(H) reception counter 117A (ST520). The reason for clearing the count value of V.21(H) reception counter 117A is to prevent the malfunction of host 113 due to the misconception of the count value of V.21(H) reception counter 117A.

Control section 116 returns the next step to ST504 after clearing the count value of V.21(H) reception counter 117A.

Next, modem 101 receives the DIS signal following the non-signal interval from the answering terminal. Control section 116 determines whether or not V.21(H) ON→OFF counter 117D indicates the predetermined number of times (ST504). At this point, V.21(H) ON→OFF counter 117D indicates the count value of 1. As the predetermined number of times for V.21(H) ON→OFF counter 117D, the number of a plurality of times is set. Therefore, since V.21(H) ON→OFF counter 117D does not indicate the predetermined number of times, control section 116 determines whether or not there is the notification indicating that the predetermined signal is received (ST505). At this point, control section 116 has received from modem 101 the notification indicating that the predetermined signal is received.

Control section 116 determines whether or not the notified predetermined signal is the procedure signal specified in Recommendation V.21(H) (ST506). Herein, the DIS signal is the procedure signal specified in Recommendation V.21 (H). Accordingly, control section 116 increases the count value of V.21(H) reception counter 117A by one (ST507).

After increasing the count value of V.21(H) reception counter 117A by one, control section 116 determines whether or not the count value of V.21(H) reception counter 117A indicates the predetermined number of times (ST508). In the case where the count value of V.21(H) reception counter 117A does not indicate the predetermined number of times, control section 116 determines whether or not to have received the notification indicating that the JM signal is detected from modem 101 (ST509). At this point, since control section 116 has not received from modem 101 the notification indicating that the JM signal is detected, control section 116 returns the next step to ST504. Control section 116 repeats the operations of ST504 to ST509 until the count value of V.21(H) reception counter 117A indicates the predetermined number of times. In addition, the count value of V.21(H) reception counter 117A is set to indicate the predetermined number of times by receiving the DIS signal once. The reason for shifting the operation to the next step when the count value of V.21(H) reception counter 117A indicates the predetermined number of times is to prevent the malfunction of host 113 due to the misconception of DIS signal.

At. ST508, in the case where V.21(H) reception counter 117A indicates the predetermined number of times, control section 116 determines the state of ON→OFF OFF→ON flag 117C in DIS determination section 117 (ST521). At this point, when the state of ON→OFF OFF→ON flag 117C is not OFF→ON, control section 116 switches the state of ON→OFF OFF→ON flag 117C to OFF→ON. Further, control section 116 increases a count value of V.21(H) OFF→ON counter 117E in DIS determination section 117 by one (ST522).

After increasing the count value of V.21(H) OFF→ON counter 117E by one, control section 116 clears the count value of non-signal counter 117B in DIS determination section 117 (ST523). Further, when the state of ON→OFF OFF→ON flag 117C is determined (ST521), in the case where the state ON→OFF OFF→ON flag 117C is OFF→ON, control section 116 also clears the count value of non-signal counter 117B (ST523). The reason for clearing the count value of non-signal counter 117B is to prevent the malfunction of host 113 caused by non-signal counter 117B misconceiving of the non-signal interval.

After clearing the count value of non-signal counter 117B, control section 116 determines whether or not to have received the notification indicating that the JMb signal is detected from modem 101 (ST509). At this point, since control section 116 has not received from modem 101 the notification indicating that the JM signal is detected, control section 116 returns the next step to ST504. Then, control section 116 performs the determination on presence or absence of the non-signal interval and DIS signal.

Thus, control section 116 repeats the determination on presence or absence of the non-signal interval and DIS signal until the count value of V.21(H) ON→OFF counter 117D indicates the predetermined number of times.

Then, in the case where the count value of V.21(H) ON→OFF counter 117D indicates the predetermine number of times at ST504, control section 116 determines whether or not V.21(H) OFF→ON counter 117E indicates the predetermined number of times (ST524). The predetermined number of times for V.21(H) OFF→ON counter 117E is smaller the predetermined number of times for V.21(H) ON→OFF counter 117D by one. In the case where the count value of V.21(H) OFF→ON counter 117E does not indicate the predetermined number of times, control section 116 returns the next step to ST504. By thus determining the count value of V.21(H) OFF→ON counter 117E, the malfunction of host 113 is further prevented.

In the case where the count value of V.21(H) OFF→ON counter 117E indicates the predetermined number of times, control section 116 determines whether or not communication control unit 100 has capabilities for performing a facsimile communication based on Recommendation T.30 (ST525). When communication control unit 100 has the capabilities for performing the facsimile communication based on Recommendation T.30, control section 116 determines whether a user desires the facsimile communication (ST526). When the user desires the facsimile communication, control section 116 controls communication control unit 100 to perform the facsimile communication (ST527).

On the other hand, in the case where communication control unit 100 does not have the capabilities for performing the facsimile communication based on 5 Recommendation T.30, or where the user does not desire the facsimile communication, control section 116 disconnects the channel connected to the answering terminal (ST528).

The next description explains about the case where the answering terminal is a communication terminal apparatus with communication capabilities other than the above-mentioned communication capabilities based on Recommendation T.30 in the case where the answering terminal is the communication terminal apparatus without the communication capabilities based on Recommendation V.8. Specifically, the following description explains about the case where despite the answering terminal having the communication capabilities based on V.32, and transmitting the ANS signal specified in Recommendation V.32 in repose to the call placed from communication control unit 100, communication control unit 100 incorrectly recognizes the ANS signal as the ANSam signal.

Also in this case, control section 116 of host 13 performs the control according to ST501 to ST504 in the same procedure as in the case where the ANSam signal is received. At this point, at ST504, V.21(H) ON→OFF counter 117D is at an initial state, and does not indicate the predetermined number of times.

Next, control section 116 determines whether or not there is the notification from modem 101 indicating that the predetermined signal is received (ST505). Since the answering terminal is the communication terminal apparatus with the communication capabilities based on Recommendation V.32, the answering terminal transmits the AC signal to communication control unit 100 after transmitting the ANS signal. The AC signal is the predetermined signal. Therefore, control section 116 receives the notification from modem 101 indicating that the predetermined signal is received.

Control section 116 determines the notified predetermined signal is the procedure signal specified in Recommendation V.21(H) (ST506). The AC signal is not the procedure signal specified in Recommendation V.21(H). Therefore, control section 116 determines the kind of the predetermined signal (ST529). The flow for control section 116 to determine the kind of the predetermined signal is explained using FIG. 8.

As illustrated in FIG. 8, control section 116 determines the kind of the received predetermined signal stepwisely. Specifically, control section 116 first determines whether or not the received predetermined signal is a signal with a carrier frequency of 2100 HZ (ST601).

At this point, in the case where the predetermined signal is the signal with the carrier frequency of 2100 HZ, control section 116 returns the next step to ST504. It is thus possible to determine whether the received predetermined signal is the signal with the carrier frequency of 2100 Hz when the signal with the carrier frequency of 2100 Hz is received even after the operation shifts to the flow for determining the kind of the received predetermined signal. It is thereby possible to prevent communication control unit 100 from malfunctioning.

On the other hand, in the case where the predetermined signal is not the signal with the carrier frequency of 2100 Hz, control section 116 determines whether the predetermined signal is the AC signal (ST602). When the predetermined signal is the AC signal, control section 116 increases a count value of an AC reception counter in host 113 by one (ST603).

Next, control section 116 determines whether the count value of the AC reception counter indicates the predetermined number of times (ST604). At this point, when the count value of the AC counter does not indicate the predetermined number of times, control section 116 returns the next step to ST504, and determines the received signal again. On the other hand, when the count value of the AC counter indicates the predetermined number of times, control section 116 determines whether communication terminal apparatus 100 has the communication capabilities based on Recommendation V.32 using the AC signal (ST605).

In the case where communication control unit 100 has the communication capabilities based on Recommendation V.32, control section 116 determines whether a user desires a communication based on Recommendation V.32 (ST606). When the user desires the communication based on Recommendation V.32, control section 116 controls communication control unit 100 to perform the communication based on Recommendation V.32 (ST607). It is thus possible for communication control unit 100 to perform the data communication with the answering terminal.

On the other hand, in the case where communication control unit 100 does not have the communication capabilities based on Recommendation V.32, or where the user does not desire the communication based on Recommendation V.32, control section 116 determines whether communication control unit 100 is set to return to the telephone mode (ST608).

In the case where the return to the telephone mode is set, control section 116 controls communication control unit 100 to return to the telephone mode (ST609). In the case where the return to the telephone mode is not set, control section 116 disconnects the channel connected to the answering terminal (ST610).

In the case where the predetermined signal notified from modem 101 is not the AC signal, control section 116 determines whether the predetermined signal is the USB1 signal specified in Recommendation V.22 (ST611). Further, in the case where the predetermined signal is not the USB1 signal specified in Recommendation V.22, control section 116 determines whether communication control unit 100 can response to the predetermined signal (ST612). Furthermore, in the case where communication control unit 100 cannot response to the predetermined signal, control section 116 returns the next step to ST504. Since the received signal is thus determined again, it is possible to prevent the malfunction of communication control unit 100.

In the case where the predetermined signal is the USB1 signal, or where communication control unit 100 can response to the predetermined signal, control section 116 increases a count value of an USB1 reception counter or a predetermined-signal reception counter in host 113 corresponding to the kind of the predetermined signal by one (ST613 and ST614).

Then, control section 116 determines whether the count values of the USB1 reception counter and the predetermined signal counter indicate the predetermined number of times (ST615 and ST616). When the count values of the USB1 reception counter and the predetermined signal counter indicate the predetermined number of times, control section 116 performs the operations of ST605 to ST610 in the same way as in the above-described case where the count value of the AC signal reception counter indicates the predetermined number of times. On the other hand, when the count values of the USB1 reception counter and the predetermined signal counter does not indicate the predetermined number of times, control section 116 returns the next step to ST504, and determines the received signal again.

As described above, according to the modem apparatus and communication control apparatus of this embodiment, by detecting the signal at the carrier frequency of the procedure signal conforming to an arbitrary type of Recommendation transmitted from an answering terminal, it is possible to recognize the type of Recommendation based on which the answering terminal performs a communication. Accordingly, when communication control unit 100 can response to the type of Recommendation based on which the answering terminal performs the communication, it is possible to continue communications according to the communication procedure of the type of Recommendation. Specifically, it is possible to continue communications according to a communication procedure based on Recommendation V.34, a facsimile communication procedure based on Recommendation T.30, and a data communication procedure based on Recommendations V.22 and V.22vis or Recommendations V.32 and V.32bis. It is thereby possible to prevent operations of communication control unit 100 from being looped in the case where the procedure signal transmitted from communication control unit 100 is different from the procedure signal transmitted from the answering terminal. On the other hand, when the modem apparatus cannot response to the type of Recommendation based on which the answering terminal performs the communication, it is possible to disconnect the channel with the answering terminal immediately. It is thus possible to reduce the communication time and communication cost spent by connecting to the answering terminal with which the modem apparatus cannot communicate.

Further, according to the modem apparatus and communication control apparatus of this embodiment, by setting variable signal detection section 105 of modem 101, it is possible to limit the reception of the procedure signal conforming to an arbitrary type of Recommendation received from the answering terminal. It is thereby possible for a user to designate the type of Recommendation that the user desires to communicate.

Furthermore, according to the modem apparatus and communication control apparatus of this embodiment, in the case where the type of Recommendation based on which the answering terminal performs the communication is Recommendation V.21(H), it is determined whether a received signal is the DIS signal based on an ON·OFF pattern of an energy of the received signal from the answering terminal. Therefore, the complicated control is not needed that the recognition is performed by observing a flag pattern of the received signal from the answering terminal, thereby making it possible to manufacture communication control unit 100 at a low price. Therefore it is possible to reduce the manufacturing cost of communication terminal apparatus 1.

As described above, according to the present invention, the procedure signal conforming to an arbitrary type of Recommendation transmitted from the answering terminal is identified, and based on the identified type of Recommendation, the operation mode such as continuation of communication is controlled. Therefore, since it is possible to response to communication procedures conforming to arbitrary Recommendations including the communication procedure based on Recommendation V.34, the facsimile communication procedure based on Recommendation T.30, and the data communication procedure based on Recommendation V.22 and others, it is possible to provide the modem apparatus, communication terminal apparatus and communication control method capable of assuredly preventing the apparatus itself from being looped.

This application is based on the Japanese Patent Application No.HEI filed on November, 1998, entire content of which is expressly incorporated by reference herein.

The present invention is not limited to the above described embodiments, and various variations and modifications may be possible without departing from the scope of the present invention.

This application is based on the Japanese Patent Application No.HEI11-154447 filed on Jun. 2, 1999, entire content of which is expressly incorporated by reference herein.

What is claimed is:

1. A communication apparatus at a calling side for performing transmission and reception of a signal with another communication apparatus at an answering side, the communication apparatus comprising:

a calling transmitter that transmits signals specified in a predetermined Recommendation;

a calling receiver that receives signals transmitted from the communication apparatus at the answering side;

a calling detector that detects the signals received by said calling receiver while said calling transmitter transmits CM signals specified in Recommendation V.8; and a controller that performs a communication procedure, at the calling side, specified in Recommendation V.34 when said calling detector detects JM signals specified in Recommendation V.8, performs a communication procedure, at the calling side, specified in Recommendation T.30 when said calling detector detects DIS signals specified in Recommendation T.30 and performs a communication procedure, at the calling side, specified in Recommendation V.22/V.22bis when said calling detector detects USB1 signals specified in Recommendation V.22/V.22bis.

2. The communication apparatus according to claim 1, wherein said calling detector detects a plurality of frequencies of the signals received by said calling receiver.

3. The communication apparatus according to claim 2, wherein said controller performs a communication procedure corresponding to frequency of a signal energy indicating a maximum value among signal energies of the plurality of frequencies detected by said calling detector.

4. The communication apparatus according to claim 1, wherein said controller performs at least one of continuing communication conforming to each Recommendation, disconnecting a channel, and returning to a telephone mode.

5. A communication apparatus at a calling side for performing transmission and reception of a signal with another communication apparatus at an answering side, the communication apparatus comprising:

a calling transmitter that transmits signals specified in a predetermined Recommendation;

a calling receiver that receives signals transmitted from the communication apparatus at the answering side;

a calling detector that detects the signals received by said calling receiver while said calling transmitter transmits CM signals specified in Recommendation V.8; and a controller that performs a communication procedure, at the calling side, specified in Recommendation V.34 when said calling detector detects JM signals specified in Recommendation V.8, performs a communication procedure, at the calling side, specified in Recommendation T.30 when said calling detector detects DIS signals specified in Recommendation T.30 and performs a communication procedure, at the calling side, specified in Recommendation V.32/V.32bis when said calling detector detects AC signals specified in Recommendation V.32/V.32bis.

6. The communication apparatus according to claim 5, wherein said calling detector detects a plurality of frequencies of the signals received by said calling receiver.

7. The communication apparatus according to claim 6, wherein said controller performs a communication procedure corresponding to frequency of a signal energy indicating a maximum value among signal energies of the plurality of frequencies detected by said calling detector.

8. The communication apparatus according to claim 7, wherein said controller performs at least one of continuing communication conforming to each Recommendation, disconnecting a channel, and returning to a telephone mode.

9. A method for performing transmission and reception of a signal from a communication apparatus at a calling side to another communication apparatus at an answering side, the method comprising:

transmitting, at the calling side, signals specified according to a predetermined Recommendation;

receiving, at the calling side, signals transmitted from the communication apparatus at the answering side;

detecting, at the calling side, the received signals while CM signals specified in Recommendation V.8 are transmitted; and performing, at the calling side, a communication procedure specified in Recommendation V.34 when JM signals specified in Recommendation V.8 are detected, performing, at the calling side, a communication procedure specified in Recommendation T.30 when DIS signals specified in Recommendation T.30 are detected and performing, at the calling side, a communication procedure specified in Recommendation V.22/V22bis when USB1 signals specified in Recommendation V.22/V22bis are detected.

10. A method for performing transmission and reception of a signal from a communication apparatus at a calling side to another communication apparatus at an answering side, the method comprising:

transmitting, at the calling side, signals specified in a predetermined Recommendation;

receiving, at the calling side, signals transmitted from the communication apparatus at the answering side;

detecting, at the calling side, the received signals while CM signals specified in Recommendation V.8 are transmitted; and performing, at the calling side, a communication procedure specified in Recommendation V.34 when JM signals specified in Recommendation V.8 are detected, performing, at the calling side, a communication procedure specified in Recommendation T.30 when DIS signals specified in Recommendation T.30 are detected and performing, at the calling side, a communication procedure specified in Recommendation V.32/V.32bis when AC signals specified in Recommendation V.32/V32bis are detected.

* * * * *

UNITED STATES PATENT AND TRADEMARK OFFICE
CERTIFICATE OF CORRECTION

PATENT NO.   : 6,577,715 B1
DATED        : June 10, 2003
INVENTOR(S)  : A. Atsuta It is certified that error appears in the above-identified patent and that said Letters Patent is hereby corrected as shown below:

<u>Column 20,</u>
Lines 34 and 36, "V.22/V22bis" should be -- V.22/V.22bis --.
Line 57, "V32bis" should be -- V.32bis --.

Signed and Sealed this

Third Day of February, 2004

JON W. DUDAS
*Acting Director of the United States Patent and Trademark Office*